US006398105B2

(12) United States Patent
Ramberg et al.

(10) Patent No.: US 6,398,105 B2
(45) Date of Patent: *Jun. 4, 2002

(54) AUTOMATIC DATA COLLECTION DEVICE THAT INTELLIGENTLY SWITCHES DATA BASED ON DATA TYPE

(75) Inventors: Jon R. Ramberg, Lynnwood; Jeffrey M. Hunt, Everett; Paul David Shoeman, Lynnwood; James T. Katsandres, Seattle, all of WA (US)

(73) Assignee: Intermec IP Corporation, Beverly Hills, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/239,222

(22) Filed: Jan. 29, 1999

(51) Int. Cl.[7] ............................ G06F 17/00; G06F 17/30
(52) U.S. Cl. ................................ 235/375; 707/1; 707/10
(58) Field of Search ................................ 235/375, 380, 235/462.01–462.49, 472.01–472.03; 709/223; 700/295; 707/1, 10; 340/10.1–10.6

(56) References Cited

U.S. PATENT DOCUMENTS 4,801,786 A    1/1989   Stobbe ........................ 235/377

(List continued on next page.)

FOREIGN PATENT DOCUMENTS

JP    11243389 A   *   9/1999
JP    11312082 A   *  11/1999

OTHER PUBLICATIONS

Palmer, Roger C. "Reading, Printing and Specification of Bar Code Symbols," *The Bar Code Book,* 2nd ed., Helmers Publishing, Inc., Peterborough, New Hampshire, 1991, p. 107.

*Primary Examiner*—Karl D. Frech
*Assistant Examiner*—Jamara A. Franklin
(74) *Attorney, Agent, or Firm*—Seed IP Law Group PLLC

(57) ABSTRACT

A method and system for intelligently routing data received from an automatic data collection ("ADC") device in an ADC device platform based on its type. A data routing mechanism operates on the data-receiving side of an ADC data server. After identifying the characteristics of the input data, the data routing mechanism determines the destination for the data based on the characteristics, then routes the data to the selected destination. For some types of data, the selected destination may be an intermediate destination where the data undergoes additional processing before being transmitted to another location, while for other types of data the selected destination may be the application that ultimately processes the data. For example, the data routing mechanism may receive a set of input data, analyze the data to determine that the data is voice data, and then route the data to a speech recognition module that processes voice data. ADC devices accommodated by the system include bar code readers, speech recognition systems, RF tag readers, resonator readers, and two-dimensional symbol readers optical character recognition ("OCR") systems. The invention finds application within a network of ADC device platforms that receive requests for input data from both local and remote applications. Data may be communicated to remote users using any data protocol, including the Transmission Control Protocol ("TCP"), the User Datagram/Internet Protocol ("UDP/IP") or the User Datagram Plus Protocol ("UDP+").

38 Claims, 8 Drawing Sheets

U.S. PATENT DOCUMENTS

| | | | |
|---|---|---|---|
| 4,825,058 A | 4/1989 | Poland | 235/472 |
| 5,034,598 A | 7/1991 | Poland | 235/435 |
| 5,052,020 A | 9/1991 | Koenck et al. | 375/62 |
| 5,070,536 A | 12/1991 | Mahany et al. | 455/67 |
| 5,121,342 A | 6/1992 | Szymborski et al. | 364/514 |
| 5,218,188 A | 6/1993 | Hanson | 235/375 |
| 5,261,079 A | 11/1993 | Celi, Jr. | 395/500 |
| 5,295,154 A | 3/1994 | Meier et al. | 375/1 |
| 5,309,351 A | 5/1994 | McCain et al. | 364/132 |
| 5,322,991 A | 6/1994 | Hanson | 235/472 |
| 5,349,678 A | 9/1994 | Morris et al. | 395/800 |
| 5,365,546 A | 11/1994 | Koenck et al. | 375/9 |
| 5,404,493 A | 4/1995 | Bolme et al. | 395/500 |
| 5,418,684 A | 5/1995 | Koenck et al. | 361/680 |
| 5,425,051 A | 6/1995 | Mahany | 375/202 |
| 5,440,564 A | 8/1995 | Ovada et al. | 370/112 |
| 5,471,596 A | 11/1995 | Brown, III | 395/375 |
| 5,572,512 A | 11/1996 | Cutler, Jr. et al. | 370/13 |
| 5,577,229 A | 11/1996 | Wakerly | 395/474 |
| 5,586,281 A | 12/1996 | Miyama et al. | 395/405 |
| 5,588,148 A * | 12/1996 | Landis et al. | 707/1 |
| 5,604,516 A | 2/1997 | Herrod et al. | 345/168 |
| 5,623,603 A | 4/1997 | Jiang et al. | 395/200.04 |
| 5,793,973 A * | 8/1998 | Birdwell et al. | 709/223 |
| 5,841,970 A * | 11/1998 | Tabuki | 713/201 |
| 5,918,224 A * | 6/1999 | Bredenberg | 707/2 |
| 5,960,432 A * | 9/1999 | Werner | 707/10 |
| 6,112,206 A * | 8/2000 | Morris et al. | 707/10 |
| 6,151,598 A * | 11/2000 | Shaw et al. | 707/3 |
| 6,173,322 B1 * | 1/2001 | Hu | 709/224 |
| 6,178,362 B1 * | 1/2001 | Woolard et al. | 700/295 |

* cited by examiner

AUTOMATIC DATA COLLECTION DEVICE THAT INTELLIGENTLY SWITCHES DATA BASED ON DATA TYPE

TECHNICAL FIELD

The invention relates generally to automatic data collection ("ADC") devices and more particularly to intelligently routing data received from ADC devices based on a data type.

BACKGROUND OF THE INVENTION

Automatic Data Collection ("ADC") device platforms, such as ADC device platforms equipped with bar code readers, have received increasing commercial attention in the past few years. ADC device platforms, such as hand-held data collection terminals, or hand-held personal computers, have been widely implemented in the retail marketplace and have garnered increasing utilization in a diverse range of application areas. The ever-decreasing cost and size of ADC device platforms has facilitated their entry into a wide variety of commercial, institutional, and governmental settings.

An ADC device platform having bar code reader adeptly accesses and retrieves data stored in the form of a bar code label. Data representing virtually any product or service found in the stream of commerce may be encoded in a bar code label for later access by an ADC device platform having a bar code reader. Bar code readers include laser scanners as well as other means of collecting product information, such as a bar code wand, a still camera or an area imager. In addition to bar code labels, other ADC data formats include Radio Frequency ("RF") tags, resonators, SmartCards, magnetic strips, Optical Character Recognition ("OCR"), speech input two-dimensional ("2D") symbols, dipole devices (such as those recited in U.S. Pat. No. 5,581,257), and any symbol having encoded data therein.

In a conventional ADC device platform environment, the recipient of ADC data either physically manipulates he ADC device platform itself to retrieve the ADC data or receives the ADC data through a local, and probably proprietary, network. Thus, a typical ADC device operator is limited both in terms of the distance from which the operator may be located away from the actual device and by the complexity and versatility of the elements that comprise the ADC device network which the operator uses. The operator suffers from still further limitations due to the fact that many conventional ADC device platforms are not readily configurable for new ADC devices, or even for ADC devices other than those attached to the ADC device platform when it is initially sold. Yet another limitation in a conventional ADC device platform arises when an operator wishes to add a new ADC device to one of the few ADC device platforms that will accept new ADC devices. This limitation stems from the fact that many ADC devices require proprietary communications protocols, and even when the communications protocols are non-proprietary, the communications protocols are typically non-standard. Thus, the operator cannot simply attach a new ADC device to an existing ADC device platform and expect that the new combination will function properly. Finally, the above limitations, both separately and together, hinder an ADC operator's ability to customize the ADC device platform to operate in the most productive possible manner.

Input data received by an ADC device platform must be routed to the intended destination. Conventional ADC device platforms typically have a simple connection that routes one type of data from a single ADC device to a single destination, typically an application program. However, ADC data consumers presently demand sophisticated and customizable ADC device platforms that receive data from multiple ADC devices and route the data, of multiple types, to multiple destinations. In addition, consumers expect their ADC device platforms to be reconfigurable for new ADC devices and new data-receiving applications. Many consumers also need their ADC device platforms to handle data without requiring modification of the destination application. Many destination applications are owned by third parties and cannot be modified without their permission and cooperation. Accordingly, a need exists for sophisticated and customizable methods and systems for channeling input data to various destinations without requiring modification of a destination application.

SUMMARY OF THE INVENTION

Aspects of the invention provide a method and system for intelligently routing data collected by one or more automatic data collection ("ADC") devices on an ADC device platform based upon the data type of the data received from the ADC devices. The method and system are applicable to data received from all ADC devices configured on an ADC device platform.

Under one aspect of the invention, an ADC routing mechanism analyzes the data type of the incoming ADC data, references an ADC data grid containing ADC client data requests, and the routes the received data to the appropriate client(s). The ADC data routing mechanism may comprise an ADC data server, ADC device handlers, ADC protocol handlers, and an ADC data grid, according to an embodiment of the invention. The ADC device handlers and ADC protocol handlers translate received ADC data into a non-device specific form suitable for processing by the ADC data server. The ADC data server analyzes the received ADC data to determine its data type. The ADC data server then references the ADC data grid to determine which clients have registered data requests matching the received ADC data. The ADC data server next transmits the ADC data to the identified client(s).

Aspects of the invention ensure that ADC data once having been identified is then matched to criteria received clients of the ADC device platform. Aspects of the invention further ensure transmission of the ADC data to the identified client. For some types of data, the selected destination may be an intermediate destination where the data undergoes additional processing before transmission to the client. For other types of data, the selected destination may be the client application that ultimately processes the data. For example, the data routing subsystem may receive input data from an ADC device, analyze the data to determine that the data is voice data, an then route the data to a speech recognition application (client) that processes voice data.

Aspects of the invention may be utilized in a network containing a plurality of remotely controlled ADC device platforms. Each ADC device platform in the plurality of network ADC device platforms may contain an embodiment of the invention. The various ADC device platforms equipped with embodiments of the invention transmit the requested data to the remote applications. For example, a remote application may register the same data request with an unlimited number of ADC device platforms, and whenever that registered data type arrives from any ADC device configured with any of the ADC device platforms, then the ADC data routing mechanism routes the data to the remote application.

ADC devices accommodated by embodiments of the invention include bar code readers, speech recognition systems, RF tag readers, resonator readers, SmartCard readers, two-dimensional symbol readers, ASCII data devices, AIMI-ECI data devices, dipole device readers, and optical character recognition ("OCR") systems. Data may be communicated to remote and local applications using any data protocol, including the Transmission Control Protocol ("TCP"), the User Datagram/Internet Protocol ("UDP/IP"), or the User Datagram Plus Protocol ("UDP+"), which is noted below.

BRIEF DESCRIPTION OF THE DRAWINGS

An exemplary embodiment of the invention will be described below relative to the following figures. Note that similar elements and steps in the figures have the same reference number. For ease in identifying the discussion of any particular element, the most significant digit in a reference number refers to the figure number in which that element is first introduced (e.g., element 204 is first introduced and discussed with respect to FIG. 2.)

DETAILED DESCRIPTION OF THE INVENTION

Figure 1:
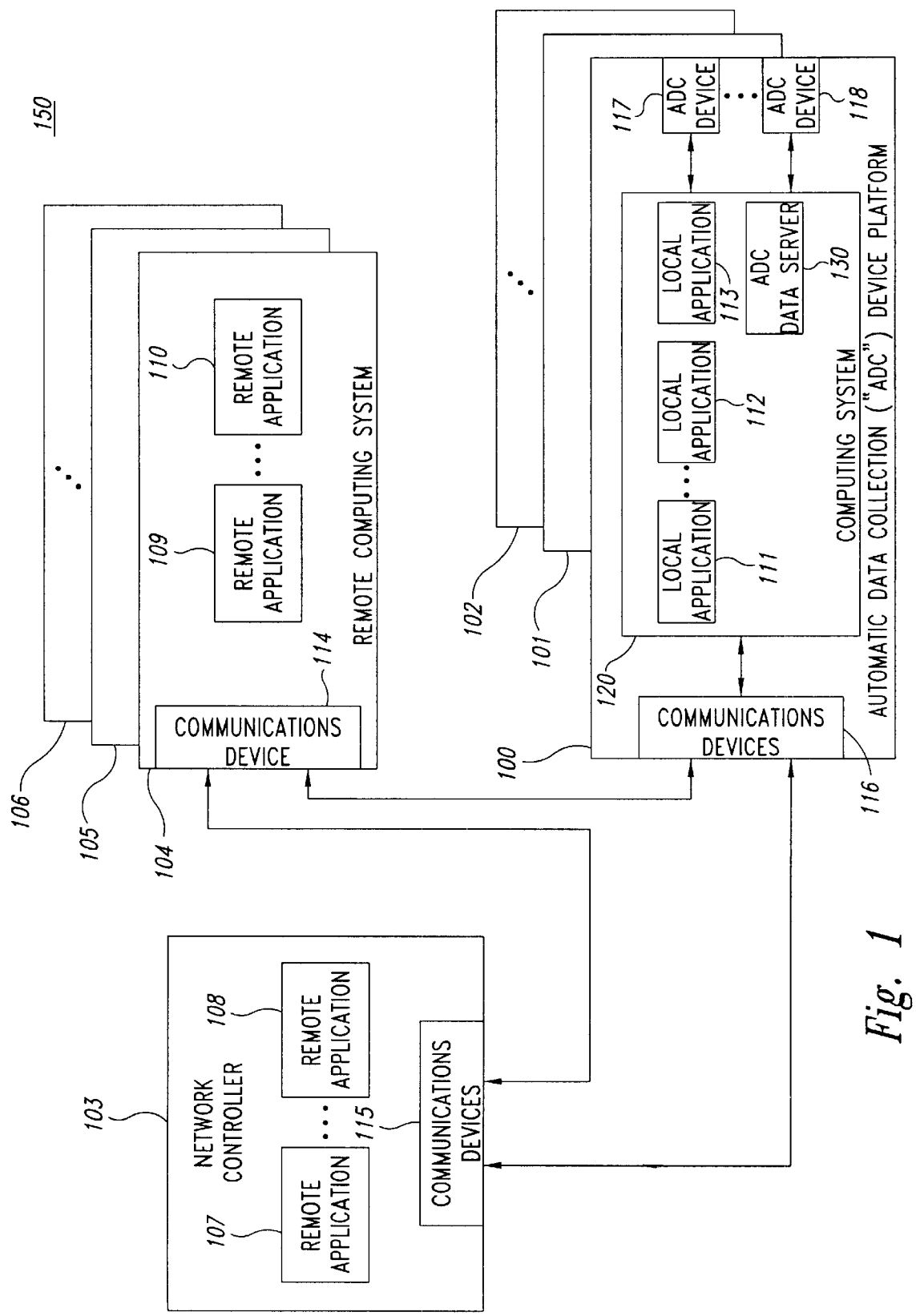
FIG. 1 depicts an ADC network 150 comprising a network controller 103, remote computing systems 104–106, and ADC device platforms 100–102 through which ADC data may be directed by an embodiment of the invention.

FIG. 1 depicts an ADC network 150 comprising a network controller 103, remote computing systems 104–106, and ADC device platforms 100–102 through which ADC data may be directed by an embodiment of the invention. The ADC network 150 may comprise additional remote computing systems, as indicated by the ellipsis between the remote computing system 105 and the remote computing system 106. The ADC network 150 may also comprise fewer than three remote computing systems in some embodiments. In addition, the ADC network 150 may comprise additional ADC device platforms, as indicated by the ellipsis between the ADC deice platform 101 and the ADC device platform 102. The ADC network 150 may also comprise fewer than three ADC device platforms in some embodiments.

Using the ADC network 150, a remote operator at the remote computing system 104, for example, may receive data from ADC devices on the ADC device platform 100, such as an ADC device 117, an ADC device 118, or from both the ADC devices 117, 118 concurrently. A local operator at an ADC device platform, such as the ADC device platform 100, may similarly receive data from the ADC devices 117, 118. The ADC network 150 also allows an operator to control characteristics of the ADC platform 100 and any configurable subsystems on the ADC device platform 100. An operator may perform file transfers, view files, provide firmware upgrades and review graphically-represented unit performance statistics using the ADC network 150. An operator may also view a map of all ADC device platforms 100–102 in the ADC network 150 and their current status.

The remote computing systems in the ADC network 150, such as the remote computing system 104, comprise a communications device 114, and remote applications 109, 110. The ellipsis between the remote application 109 and the remote application 110 indicates that the remote computing system 104 may contain more than two remote application. The remote computing system 104 may be a Windows95-equipped personal computer ("PC"), a UNIX workstation, an IBM host computer, a WindowsCE-equipped hand-held computer, or any computing system capable of performing the tasks described herein. The Microsoft Corporation produces the Window95 and WindowsCE operating systems.

The remote application 109 on the remote computing system 104 may include a browsing capability that facilitates data communication with the ADC device platform 100 over the ADC network 150. The ADC device platform 104, for example, may have a uniform resource locator ("URL") that facilitates communication between the ADC device platform 104 and the remote application 109. The remote web browser may host Java applets that coordinate data transfer from an ADC device on the ADC device platform 100 to the remote computing system 104. The remote computing system 104 may receive the Java applets from a variety of sources, including the ADC device platform 100 itself. The remote application 109 may also communicate with the ADC device platform 100 using other communications method.

The network controller 103 includes communications devices 115 and the remote applications 107–108. The ellipsis between the remote application 107 and the remote application 108 indicates that the network controller 103 may contain more than two remote applications. In addition, the network controller 103 may contain fewer than two remote applications in some embodiments. The network controller 103 further includes applications that configure and manage lie ADC device platforms 100–102 and the elements comprising the ADC device platforms 100–102. The remote computing systems 104–106 also may configure the ADC device platforms 100–102, either directly or indirectly via the network controller 103. An exemplary system and method for managing and configuring ADC device platforms is described in a provisional patent application entitled "Automatic Data Collection Device Having A Network Communications Capability," U.S. Provisional Application No. 60/084,272, filed on May 4, 1998, and assigned to a common assignee.

An exemplary ADC device platform, such as the ADC device platform 100, includes communications device 116, a computing system 120, and the ADC devices 117, 118. The ADC device platform 100 may comprise more than two ADC devices as indicated by the ellipsis between the ADC device 117 and the ADC device 118. The ADC devices 117, 118 may comprise, for example, bar code readers, radio frequency ("RF") tag readers, resonator readers, SmartCard readers, magnetic stripe readers, two-dimensional ("2D") symbol readers, optical character recognition ("OCR") readers, ASCII data devices, AIMI-ECI data devices, speech input recognizing devices, text-to-speech recognition devices, dipole device readers, an all other forms of scanning or imaging devices. AIMI-ECI ("extended channel interpretation") utilizes symbol value ranges (e.g., the range 00000 to 811,799) that represent particular classes of items (e.g., retail merchandise). An exemplary RF tag reader suitable for use in the ADC device platform 100 is described in U.S. application Ser. No. 08/771,320, entitled, "Automatic Mode Detection and Conversion System for Printers and Tag Interrogators," filed on Apr. 27, 1998 and assigned to a common assignee. The ADC device 117 may be a different type of, or the same as, the ADC device 118.

The computing system 120 in the ADC device platform 100 may utilize any suitable operating system. In a preferred embodiment, the computing system utilizes a WindowsCE operating system. The computing system 120 includes local applications 111–113 and an ADC data server 130. The computing system 120 may include more than three local applications, as indicated by the ellipsis between the local application 111 and the local application 112. Embodiments of the computing system 120 may contain fewer than three local applications.

The ADC data server 130 performs tasks such as managing multiple local and network ADC applications and collecting, filtering, buffering, and distributing data from multiple ADC devices to multiple clients such as the local application 111 and the remote application 109. The ADC data server 130 provides device-independent logical connections between client applications, such as the local applications 111–113 and the emote applications 107–110, for data communication with the ADC devices 117, 118. At the request of client applications, the ADC data server 130 collects data from the ADC devices 117, 118 and distributes it to the clients while also allowing the clients to write instructions regarding the disposition of data received from the ADC devices 117, 118.

A remote client, such as the remote application 107, is an ADC client running on a computing system other than the computing system 120. If the computing system 120 uses the WindowsNT or Windows98 operating systems then "DCOM" may be used to communicate to the ADC data server 130, according to an embodiment of the invention. DCOM, or "Distributed Component Object Model," stipulates how software components, small, reusable programming elements, communicate over Windows-based networks and permits the distribution of different components for a single application across two or more networked computers, such as the computing system 120 and the remote computing system 104, such that distribution of the components is not apparent to the user.

If the computing system uses a non-Windows operating system, then a TCP/IP sockets interface will be used. Sockets provide an identifier for a particular service on a particular node of a network. The socket consists of a node address and a port number that identifies the service. The Transmission Control Protocol ("TCP"), governs the break up of data messages into packets to be sent via the Internet Protocol ("IP") and the reassembly and verification of the complete messages from packets received. The ADC data server 130 allows multiple clients, such as the remote application 109 and the local application 111, to access multiple ADC devices without burdening these client applications with an understanding of the low level ADC device protocols or how to share access to multiple ADC devices.

The ADC data server 130 operates in conjunction with ADC protocol handlers and ADC device handlers. ADC protocol handlers and ADC device handlers encapsulate ADC device management, so adding a new ADC device to the ADC device platform 100 does not require modifications to the ADC data server 130. The ADC data server 130 may also communicate with a reader command gateway to provide commands for the ADC devices. The ADC data server 130 further notifies ADC devices, such as the ADC devices 117 and 118, when their configuration has changed to support on-the-fly configuration changes. The local applications 111–113 and the remote applications 107–110 may send operational and configuration commands to the ADC devices 117, 118.

Figure 2:
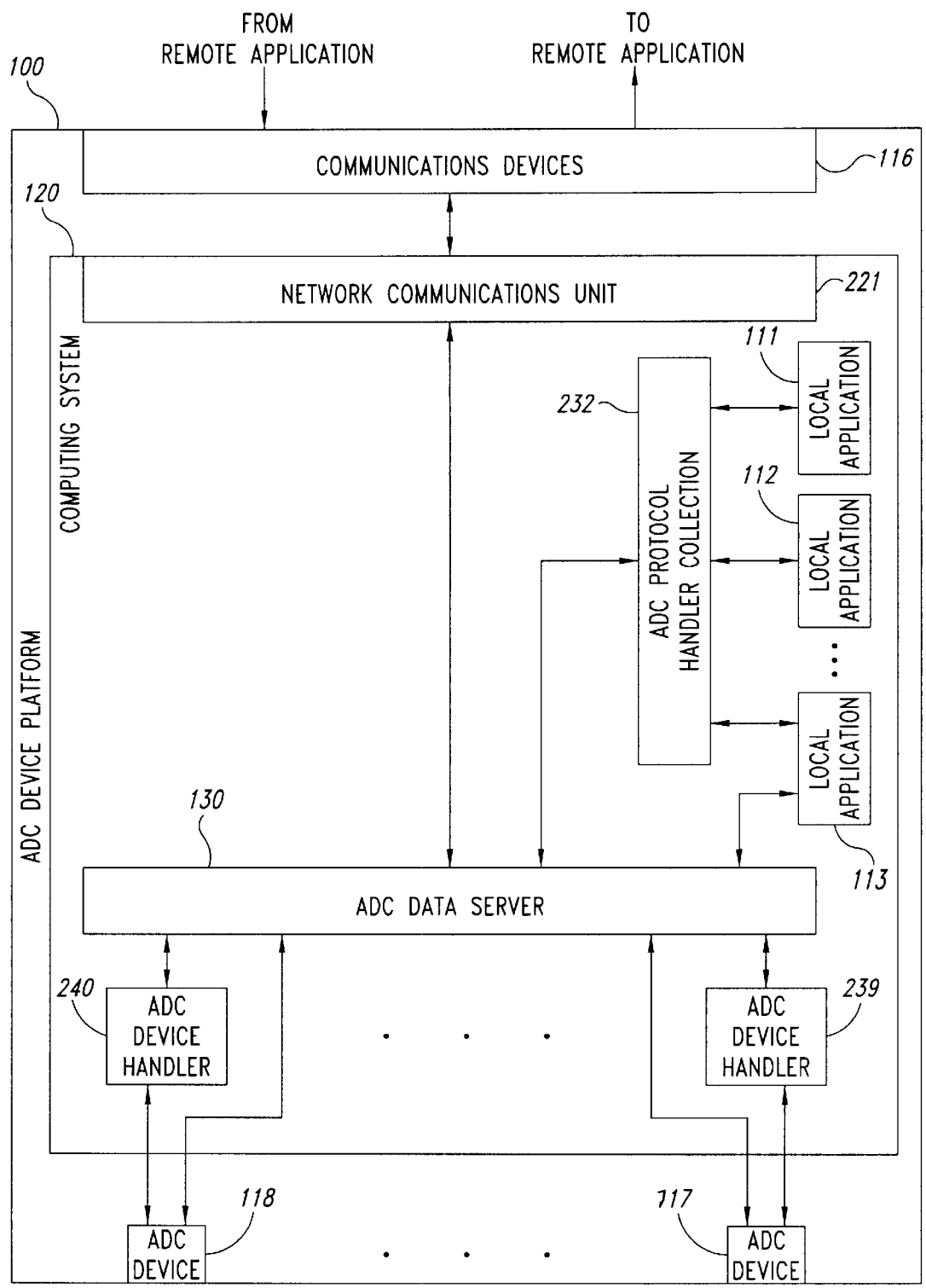
FIG. 2 provides a more detailed illustration of the computing system 120 in the ADC device platform 100, according to one embodiment of the invention.

FIG. 2 provides a more detailed illustration of the computing system 120 in the ADC device platform 100, according to an exemplary embodiment of the invention. The computing system 120 enables the intelligent routing of data from ADC devices, such as the ADC device 117, to clients, such as the remote application 107 and the local application 111. The computing system 120 comprises an ADC protocol handler collection 232, ADC device handlers 239, 240, and a network communications unit 221, according to an embodiment of the invention.

The ADC data server 130 communicates with remote ADC clients, such as the remote application 109, through the network communications unit 221. In a preferred embodiment, remote ADC clients communicate with the ADC data server 130 using the Winsock 1.1 socket's interface over TCP/IP. Winsock is an application programming interface ("API") that provides a TCP/IP socket interface in the Windows operating system. Embodiments of the network communications unit 221 may utilize a variety of communications methods in communicating with remote applications, including sockets, TCP/IP, UDP, and UDP+.

The User Datagram Protocol ("UDP") is a connectionless protocol parallel to TCP in the IP communication stack. UDP converts data messages generated by an application into packets to be sent via IP, but does not verify that the messages have been delivered correctly. Therefore, UDP is more efficient than TCP, although the reliability of UDP depends on the application generating the message. UDP+ provides additional functionality that is not provided by UDP, such as guaranteed packet delivery and packet ordering. The ADC data server 130 supports all physical communication methods provided by TCP/IP, UDP, and UDP+ such as serial communication and Infrared Data Association ("IRDA") standard communication. UDP+ is further described in U.S. application Ser. No. 08/852,002, entitled, "Reliable Communication over an Unreliable Transport Layer in a Hand-Held Device using User-Configurable Timers," and U.S. application Ser. No. 08/851,848, "Providing Reliable Communication over an Unreliable Transport Layer in a Hand-Held Device using a Persistent Session," both filed on May 6, 1997 and assigned to a common assignee.

After a successful connection with a client application, including both local and remote applications, the ADC data server 130 dedicates resources to handle all communications to the client application, ensuring that communication problems with one client will not affect other remote or local clients. In one embodiment, the communication scheme utilized between the remote applications, such as the remote application 109, and the ADC data server 130, provides a variable length, packet message format. A client, such as the remote application 109, performs a first read to determine the message length. The client next allocates a sufficiently large buffer to hold the response and performs a second read to retrieve the rest of the message.

If communication errors occur while the ADC data server 130 communicates with a client, such as the remote application 109, the ADC data server 130 tries to re-establish communication before closing the connection. After closing the connection, the ADC data server 130 maintains the client data and resources for a user-configurable time period so that the client may reconnect with the ADC data server 130. The reconnect time out period is configurable by users of the ADC device platform 100. After the reconnect time out period, the ADC data server 130 discards all data resources for the client. The ADC data server 130 uses a "no activity time out" to control client communications when the ADC data server 130 "pings" clients for which there has been no recent activity. For clients that fail to respond, the ADC data server 130 enters a communication "retry" mode similar to the connection error mode above.

The ADC device platform 100 maintains an ADC device handler 239–240 and an ADC protocol handler (in the Protocol Handler Collection 232) for each ADC device, according to an embodiment of the invention. The ADC protocol handlers format messages for device-unique functions, while the ADC device handlers format messages for device-common functions. The ADC device handler and ADC protocol handler pair hide device-specific protocols from the ADC clients, simplifying the addition of ADC devices to the ADC device platform 100. The ADC protocol handler collection 232 contains the ADC protocol handlers.

The ADC device handlers, such as the ADC device handler 239, accept commands from the ADC data server 130, translate them into commands for their respective ADC device, and send them to the ADC device using a serial channel or any other means for communicating with the ADC device such as short haul RF and parallel channel. The ADC data server 130 utilizes the ADC device handlers 239, 240 for communicating instructions to the ADC devices 117, 118, respectively. Each supported ADC device, such as the ADC device 118, has a corresponding ADC device handler, such as the ADC device handler 240 for the ADC device 118. Accordingly, if the ADC device platform 100 includes more than two ADC devices, then the computing system 120 will include more than two ADC device handlers. The ADC device handlers hide the specific access requirements for a respective ADC device from the ADC clients, such as the local application 111 and the remote application 109. The ADC device handlers are COM objects that provide a transport layer for sending data formatted by the corresponding ADC protocol handler in the ADC protocol handler collection 232 to the ADC device, according to an embodiment of the invention. COM objects, or "Component Object Model" objects, are software components that may be assembled into programs or add functionality to existing programs, COM objects may also be easily removed from programs. The invention does not require the use of COM objects, and any appropriate technology may be used instead, such as Dynamic Link Libraries ("DLLs").

The ADC protocol handlers in the ADC protocol handler collection 232 provide APIs that allow applications to retrieve ADC data and control ADC devices, such as the ADC devices 117, 118. Each ADC protocol handler in the ADC protocol handler collection 232 is a COM object that supports an ADC device-specific interface to guarantee access to the interface for the ADC data server 130, according to an embodiment of the invention. The ADC device-specific interface operations include opening a client communications channel to a specific ADC device, such as the ADC device 117. For ADC devices that support client handles, the ADC device-specific interface issues a device request that causes the ADC device to return a client handle. A client handle is a numeric value used by the device to identify specific clients. A client handle is assigned to an application when the application first requests a communications channel with the device. A client is a single instance of an application that communicates with the device. For ADC devices that do not support handles, the corresponding ADC device handler itself may generate a handle, according to some embodiments of the invention.

The ADC data server 130 calls the appropriate ADC device handler to receive responses from an ADC device. Responses provided by an ADC device handler from its corresponding ADC device may include additional information along with the response data to help match the response data to the request that generated the response data or to a client who should receive the data. For example, a read request may return a sequence number, a client handle, a data class specification, and a data set. The sequence number associates a particular read request with a specific response, e.g., the request includes a sequence number. The ADC device handler does not guarantee that the sequence number will be returned. For example, unsolicited responses produced by an ADC device may not have a sequence number, and some ADC devices do not support sequence numbers. The client handle associates input from an ADC device with a specific client. If the ADC device (or the ADC device handler) supports client handles, a client's read request will return the appropriate client handle. The data class specification indicates the data classes to which the response data belongs. The ADC data server 130 may store the data class specification along with the data for retrieval by the appropriate client(s).

When a data read returns a client device handle (and a zero for the sequence number), the ADC data server 130 routes the data to the client having the same client device handle. A client device handle of zero indicates that there is no handle for the response data. If both the sequence number and client device handle are non-zero, the sequence number takes precedence.

When the ADC device handler returns a sequence number of zero and a client device handle of zero, the ADC data server 130 performs grid processing to determine which client(s) should receive the data, according to an embodiment of the invention. First, the ADC data server 130 performs non-device specific grid processing to match one or more data masks with the data received from the ADC device. Data masks will be discussed more fully below. The ADC data server 130 next calls the appropriate ADC device handler's "match grid" function to perform device-specific grid processing. If both grids match, then the response is routed to the identified client.

The ADC data server 130 intelligently routes data to one or more clients based upon routing data stored in an ADC data grid, shown and described below with respect to FIG. 3. The ADC data grid operates as a data filter. The ADC data server 130 supports data filtering so that the data sent to ADC clients matches their requested grid criteria. The ADC data server 130 supports non-ADC device-specific grid criteria, such as a general request for a particular data type from any ADC device. The ADC protocol handlers support ADC device-specific grid criteria, such as a request for a particular data type for a particular ADC device. The ADC data grid may be changed dynamically. The ADC data grid may comprise three components, according to an embodiment of the invention. The three components are one or more data classes, a device-independent grid data mask, and a device-dependent grid mask. A device-dependent mask is specific to the device type. For example, a device-dependent mask may exist for Code 39, which is a type of data that may be produced from an ADC device known as a bar code scanner. Non-device specific grid criteria may be represented in a data mask, having a data pattern such as "###-##-####" where "#" represents a numeric value and "-" represents a dash literal. A literal is a value used in a program that is expressed as itself rather than as a variable's value or the result of an expression. The ADC data server 130 finds a match when an ADC data grid specification matches received data. To perform grid matching, the ADC data server 130 first attempts to match one of the data classes and then tries to match the device-dependent grid and the device-independent grid, according to an embodiment of the invention. If all three conditions are satisfied, then the data response will be returned to the client. In other words, the grid specifications may be logically "ANDed" to determine whether the ADC data grid matches the received data.

Of course, each client application will typically complete the following sequence in order to read data: perform an Open(Device) operation, perform a series tasks such as Read(Data_Grid) and device control, concluding with a Close( ) task when the client does not wish to access the ADC device anymore, according to an embodiment of the invention. The open/close operations are typically performed only once, while other device accesses may be performed multiple times by the client application.

The ADC data grid contains a data class specification that identifies the data classes accepted for a client and the data classes specifically disallowed. A data class is a device-dependent classification of data responses from an ADC device. A data class is a classification of ADC device data so that data can be broadly grouped. For example, USER_INPUT may be one data class while READER_COMMAND may be another class of device data. The ADC device handler identifies an ADC device response with one or more data classes. Data classes can identify responses that come from device configuration requests, responses that come from user-entered data, and responses that come from ADC data server requests. The ADC protocol handler may change the data class specification. When the protocol handler sends a read request to an ADC device, the ADC protocol handler specifies one or more data classes requested to be read. The data class specification identifies the data classes that may be queued for the client and those that are specifically disallowed.

The mechanism for intelligently routing data based upon data type may also be utilized in conjunction with a dynamic wedge that may route data received from ADC devices according to characteristics beyond data type. For example, the ADC data server's support of data routing may be expanded to include routing based upon device-specific and non-device-specific characteristics such as a data value range (for example, the data values from 23 to 192); a number of data elements, and a range for the number of data elements (for example, barcode labels containing from 6 to 9 characters). An exemplary dynamic wedge is described in U.S. application Ser. No. 09/240,425, entitled "Automatic Data Collection ("ADC") Device That Dynamically Wedges Data Transmitted To Data Consumers," filed on Jan. 29, 1999 and assigned to a common assignee.

The ADC data server 130 uses shared memory and process synchronization objects to perform inter-process communication ("IPC"), such as communications with an ADC device driver for an ADC device. The IPC mechanisms are hidden within the ADC data server's API, and the ADC device handlers. The ADC data server API provides an ADC device-ADC data server interface. The ADC device-ADC data server interface hides the IPC mechanism from the ADC data server process. The ADC device-ADC data server interface initializes and deletes an ADC data server API COM object for each ADC device and opens and closes a logical communications channel with each ADC device, such as the ADC device 117. The ADC data server 130 determines the default channel attributes.

The ADC device-ADC data server interface may request data from the ADC data server 130. The request produces a "data class mask" that identifies the class of data to be sent to a particular client, as discussed above. The data class masks may be device dependent or device independent. The ADC data server 130 forwards data based upon the mask(s) identified. The ADC device-ADC data server interface also provides functions for discovering specific ADC device attributes or specific client handle attributes. Device attributes include the device's enablement status. Client handle attributes include the device-dependent grid, the device-independent grid, read ahead status, and the data class read specification.

The ADC device-ADC data server interface also provides functionality for adjusting specific ADC device attributes. The ADC device-ADC data server interface includes a "query data" function that returns the number of data items stored for a client and the size of the next data item. The ADC device-ADC data server interface further performs operations such as reading a data class, setting attributes, and matching the ADC data grid. The "match grid" command requests that the ADC device handler determine if the input data matches the input grid. Both the structure and meaning of the data, and the structure and meaning of the grid are device dependent.

The ADC data server process interface provides an open function that opens a data collection device channel and returns an ADC data server client handle that allows a client to access the ADC device. The open function creates a device client handle for the ADC device. The ADC protocol handler can retrieve a device's client handle. The ADC data server process interface also allows the setting of specific ADC device attributes, such as enable/disable status; data grid (device independent and device dependent); read ahead/non-read ahead status; ADC device client handle, and data class specification.

The ADC data server process interface also provides a read function that allows an ADC protocol handler to receive ADC data or device responses from an ADC device. The read function receives as inputs an ADC data server client handle and a data class mask indicating the classes of data to be retrieved and returns as output device-dependent data. If the data class mask indicates that ADC data will be read, the read function initiates reading ADC data from the ADC device. The ADC data server 130 calls the ADC device handler's read function to notify the ADC device that a client is ready to accept data. The read function then waits until the ADC device provides the data or until a timeout arises.

The intelligent data routing mechanism routes data from various ADC devices based on data type. The intelligent data routing mechanism provides significant flexibility and increased efficiency to the ADC device platform 100. The intelligent data routing mechanism receives data from multiple ADC devices, analyzes the data from each ADC device to determine its type, and then routes the data from each ADC device to an appropriate destination based on the data type. As discussed above, the intelligent data routing mechanism bases its routing decisions on data previously stored in an ADC data grid that maps specific clients with certain types of data.

A selected routing destination may be an intermediate destination for some types of data, where the data undoes additional processing before being transmitted to its ultimate destination. For example, the ADC data server 130 may receive a set of input data, analyze the data to determine that the data is bar code data, and then route the data to a bar code processor that identifies the bar code symbology in which the data has been encoded. Using the identified bar code symbology, the intermediate application then routes the data to those applications that have requested bar code data of the identified type.

Figure 3:
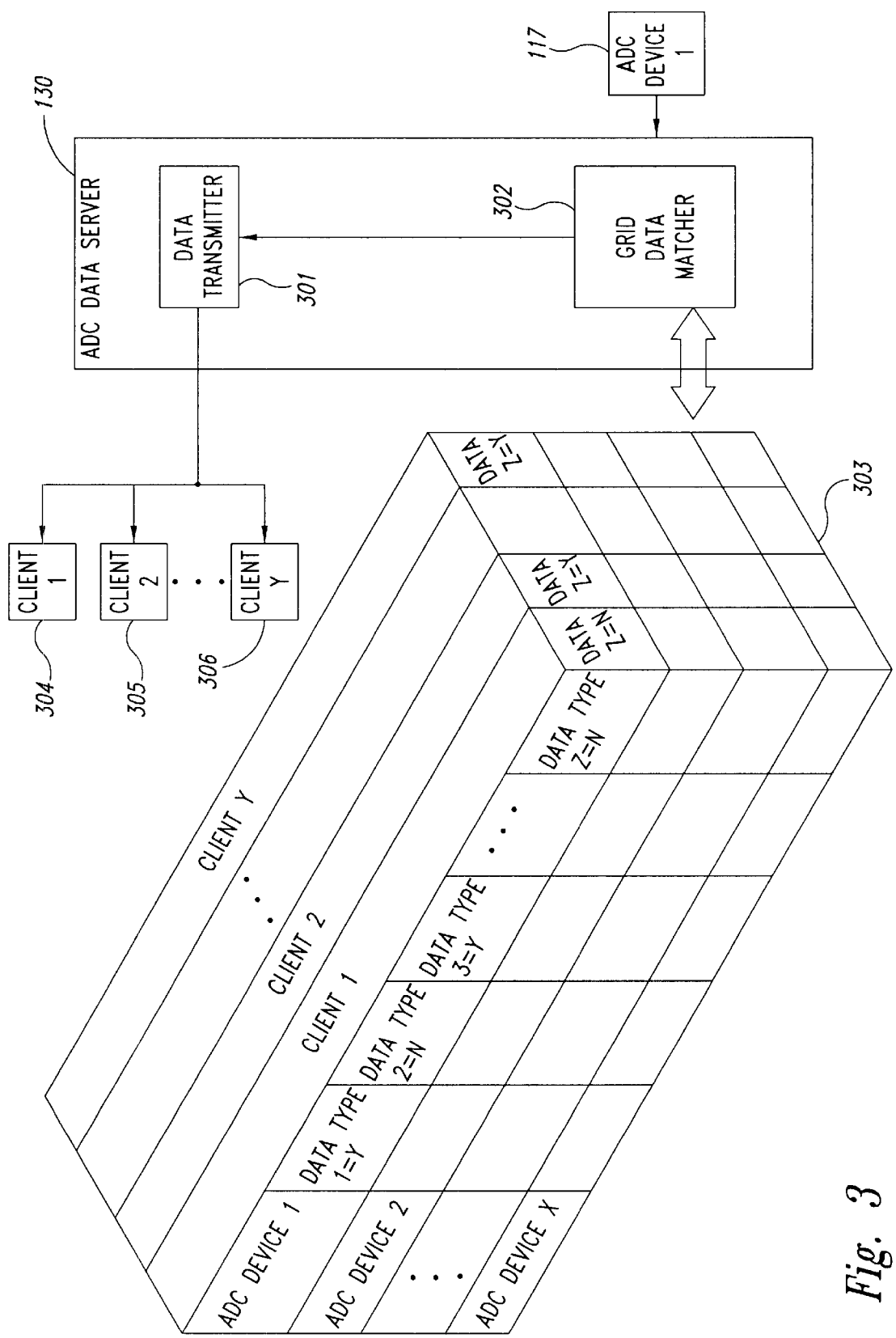
FIG. 3 illustrates an embodiment of the ADC device platform 100 that intelligently routes data to client application.

FIG. 3 illustrates an embodiment of the ADC device platform 100 that intelligently routes data to client applications. The ADC data server 130 receives data from the ADC device 117 and may transmit the received data to one or more clients 304–306. The ellipsis between the client 305 and the client 306 indicates that the ADC data server 130 may transmit data to more than three clients. The clients receiving data may include both local and remote applications, such as the local application 111 and the remote application 107 shown in FIG. 1. The ADC data server 130 may also transmit data to fewer than three clients.

The ADC data server 130 may include a data transmitter 301 and a grid data matcher 302. When the ADC device 117 transmits data to the ADC data server 130, the grid data matcher 302 analyzes the ADC data received from the ADC device 117 and then references an ADC data grid 303. The ADC data grid 303 comprises a collection of client data requests and ADC devices. For example, each client may specify the types of data that it wishes to receive from a particular ADC device. The grid data matcher 302 determines the type of ADC data sent by the ADC device 117, for example, and then references the ADC data grid 303 to determine which clients, if any, have requested data of the type received from the ADC device 117. For example, the client 304 may have requested that it receive two different types of data transmitted by the ADC device 117. Similarly, other clients may have also specified various data types with regard to data provided by the ADC device 117. The grid data matcher 302 determines how many clients will receive data of the received data type from the ADC device 117.

The grid data matcher 302 then informs the data transmitter 301 which, if any, of the clients will receive the ADC data transmitted by the ADC device 117. In some circumstances, no client may have registered to receive the type of data received from a particular ADC device. In such cases, the received ADC data will generally not be transmitted to any of the clients, but may be buffered by the ADC data server 130 for a configurable time period or until a client registers for receipt of data having such characteristics.

The ADC data grid 303 may be stored in a memory element of the computing system 120 as a unified grid or may be stored in disparate elements throughout the computing system 120. Similarly, the computing elements that perform the tasks of the grid data matcher 302 and the data transmitter 301 may constitute unique computing elements within the ADC data server 130 or may be comprised of separate computing elements that cooperatively perform the tasks discussed. For example, the grid data matcher 302 may be part of the ADC device-ADC data server interface discussed with regard to FIG. 2.

Figure 4:
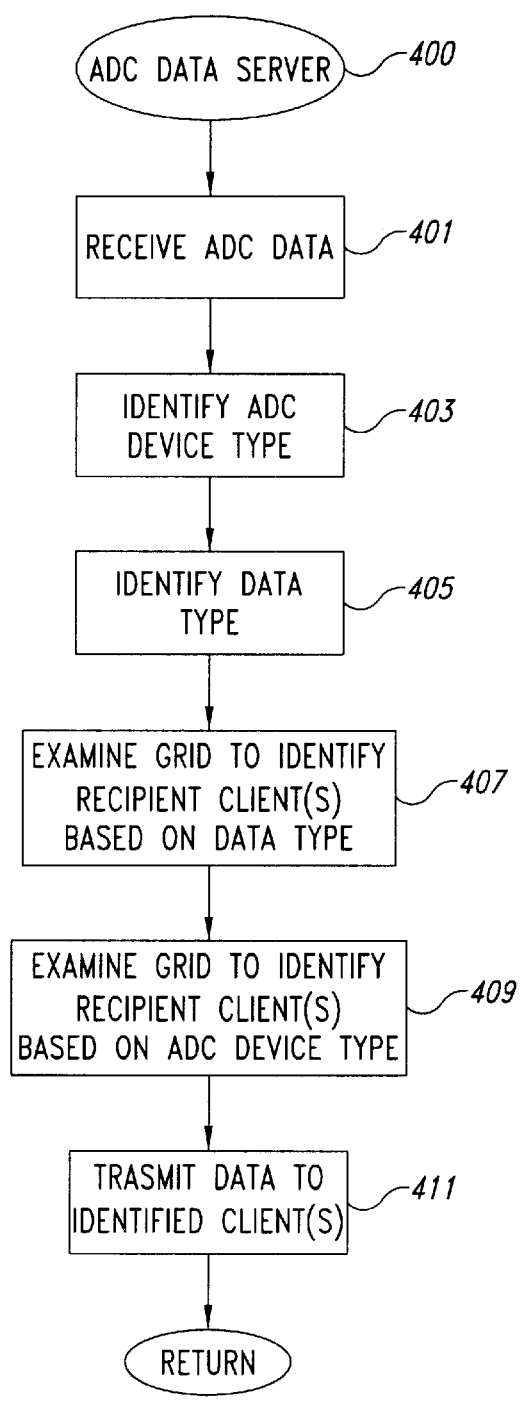
FIG. 4 is a flowchart showing the intelligent data switching operations performed by the ADC data server 130.

FIG. 4 is a flowchart showing the intelligent data switching operations performed by the ADC data server 130. The ADC data server 130 receives ADC data from an ADC device, such as the ADC device 117 (step 401). The ADC data server 130 then identifies the ADC device type (step 403). The ADC data server 130 next identifies the data type of the ADC data received from the ADC device (step 405). As discussed with regard to FIG. 3, the ADC data server 130 may include or otherwise have access to functionality such as the grid data matcher 302 that performs tasks such as those in steps 401 and 403.

The ADC data server 130 examines the ADC data grid 303 to identify recipient client(s) (e.g., the remote application 109) for the received ADC data based upon data characteristics and the ADC device (step 407). As previously discussed, the ADC data grid 303 may be interrogated by ADC data server functionality such as the grid data matcher 302. The ADC data server 130 then examines the ADC data grid 303 to identify recipient clients for the received data based upon the ADC device type (step 409). The ADC data server 130 thus analyzes a matrix comprised of data type and ADC device type to determine the recipient(s) for the received ADC data. The ADC data server 130 may alternatively perform step 409 prior to step 407.

The ADC data server 130 then transmits the ADC data to the identified clients (step 411). As previously discussed, the ADC data server 130 may transmit ADC data to one or more clients of the ADC device platform 100. Moreover, if examination of the ADC grid 303 reveals that no client has requested receipt of the received ADC data type from the ADC device, then the ADC data server 130 will generally not transmit the received ADC data to a client application.

Figure 5A:
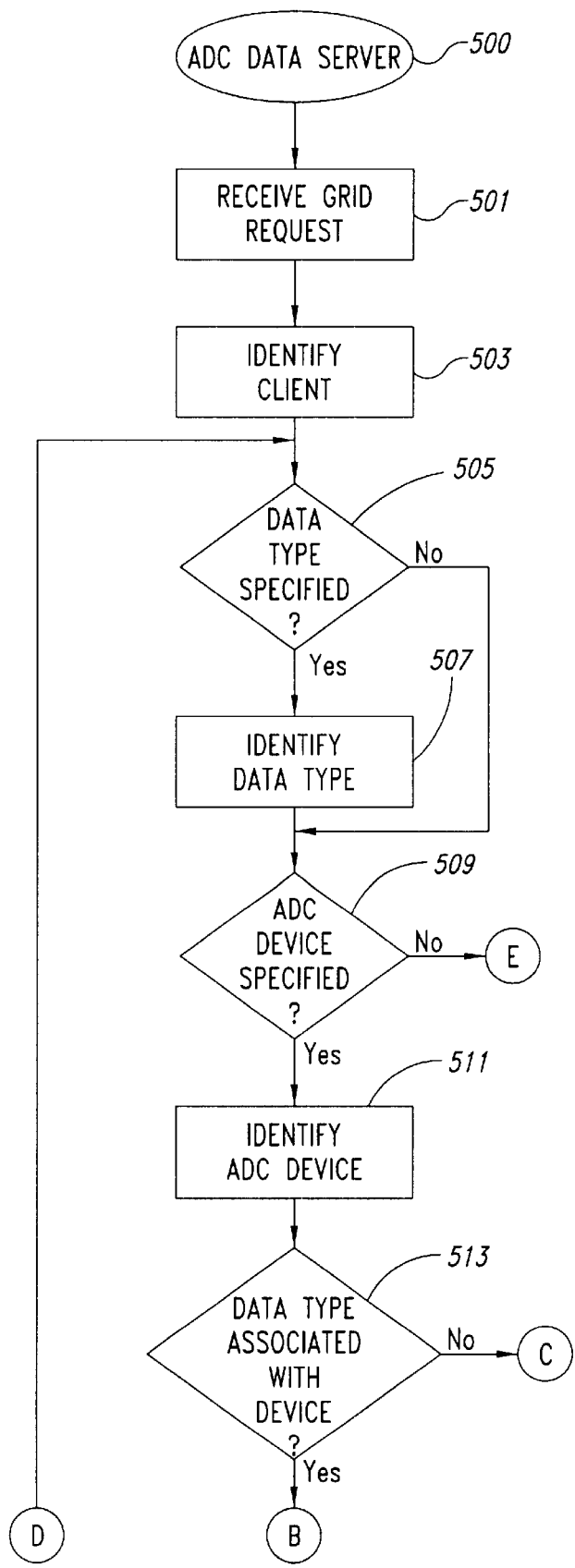
FIGS. 5A–5B are flowcharts depicting the operations of the ADC data server 130 in building a ADC data grid.
Figure 5B:
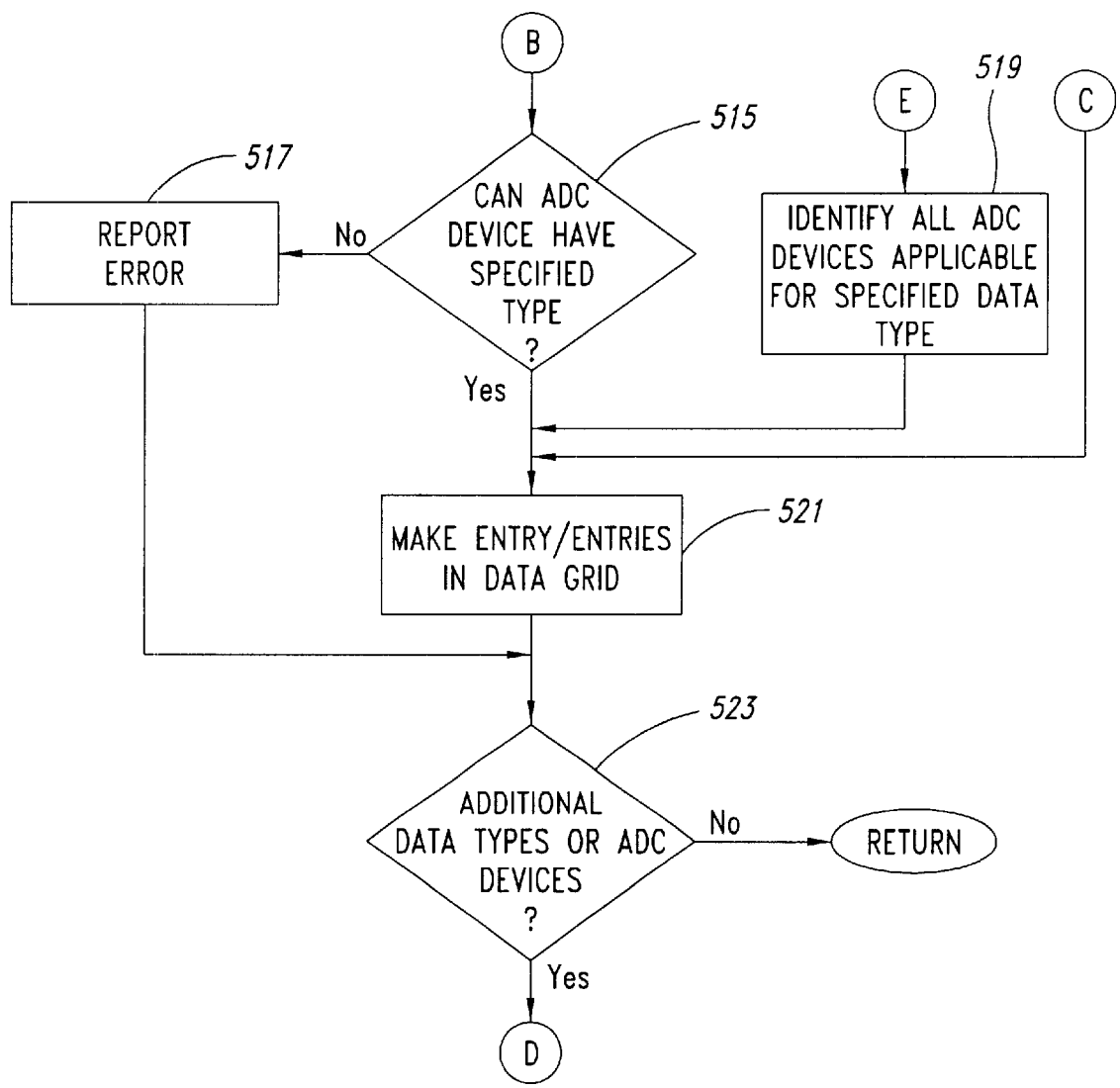

FIGS. 5A–5B are flowcharts depicting tie operations of the ADC data server 130 in building the ADC data grid 303. The ADC data server 130 receives a grid request from a client (step 501). As previously discussed, the client may either be a local application or a remote application. The ADC data server 130 identifies the client transmitting the grid request (step 503).

The ADC data server 130 then determines whether the grid request has specified a particular data type (step 505). If a particular data type has been specified in the grid request (step 505), then the ADC data server 130 identifies the data type (step 507). If the data grid request received by the ADC data server does not specify a data type (step 505), then the ADC data server 130 determines whether an ADC device has been specified in the data grid request (step 509).

If the data grid request specifies an ADC device, then the ADC data server 130 identifies the ADC device (step 511). If the ADC grid request does not specify an ADC device (step 509), then the ADC data server 130 identifies all ADC devices applicable for the data type previously specified (step 519). As previously discussed, the ADC data server 130 may have previously identified a data type (step 507).

If an ADC device has been specified (step 509), then after identifying the ADC device (step 511), the ADC data server 130 determines whether the specified data type is associated with the specified ADC device (step 513). If the specified data type is associated with the ADC device (step 513), then the ADC data server 130 determines whether the ADC device may have the specified data type (step 515).

If the specified data type is not associated with the ADC device, in terms of the format of the command received from the client, then the ADC data server 130 concludes that the specified data type (if any) and the specified ADC device type (if any) are not related (step 513). Accordingly, the ADC data server 130 knows that it should make separate entries into the ADC data grid for both the specified data type and the specified ADC device (step 521).

If the command format indicates that the specified ADC data type and the specified ADC device are related, then the ADC data server 130 determines whether the specified ADC device may have the requested data type (step 515). If the specified ADC device may have the requested type (step 515), then the ADC data server 130 makes the appropriate entry or entries into the ADC data grid (step 521). If the specified ADC device does not operate on the requested data type (step 515), then the ADC data server 130 reports an error to the client (step 517).

The ADC data server 130 next determines whether the command format includes additional data types or ADC devices (step 523). If no additional data types or ADC devices have been specified (step 523), then the ADC data server 130 terminates its processing of the received data grid request. If additional data types or ADC devices have been specified (step 523), then the ADC data server repeats its processing, beginning with step 505.

Figure 6:
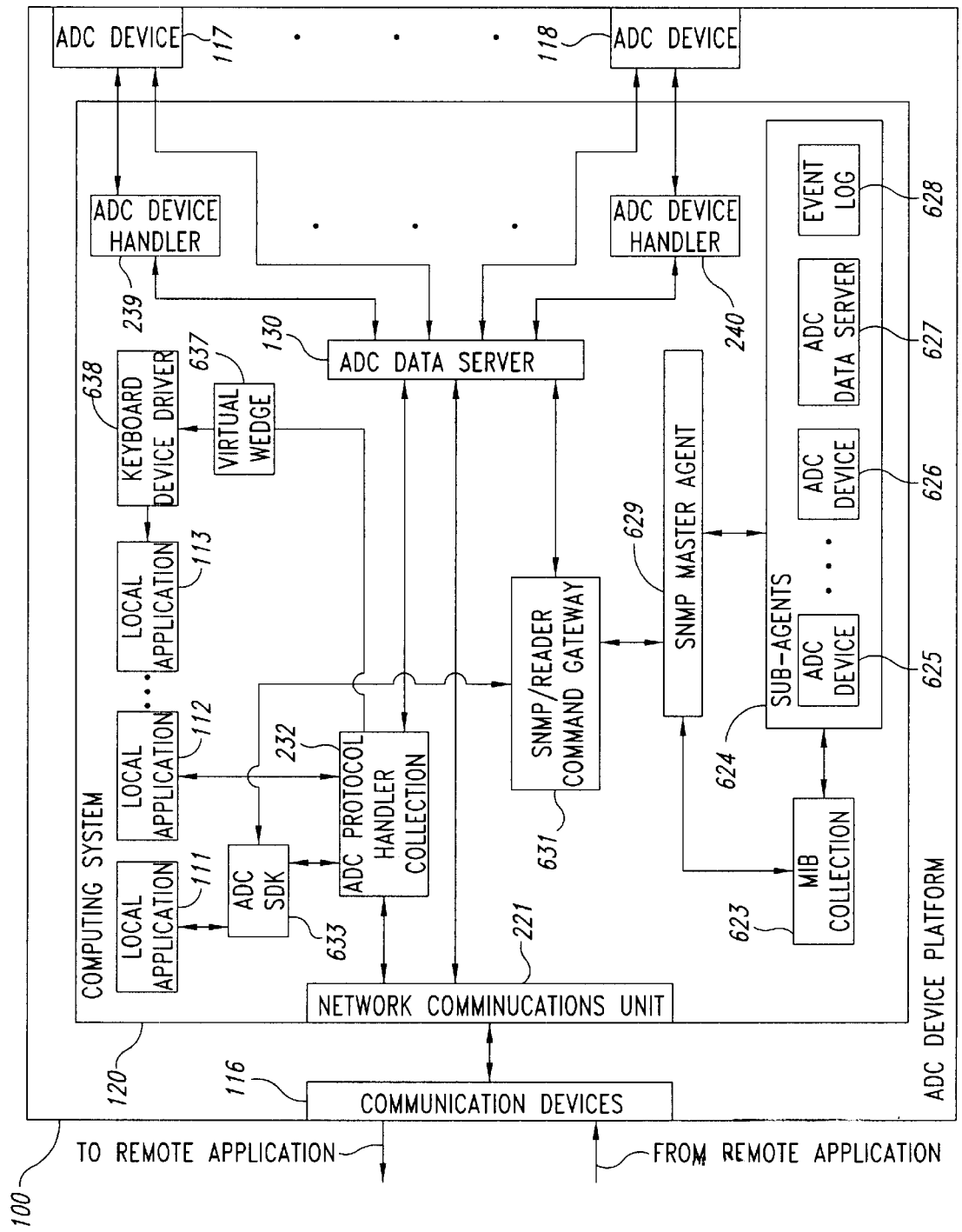
FIG. 6 illustrates an alternate embodiment of the computing system 120 in the ADC device platform 100.

FIG. 6 illustrates an alternate embodiment of the computing system 120 in the ADC device platform 100. The computing system 120 further comprises an SNMP/reader command gateway 631, an SNMP master agent 629, a management information base ("MIB") collection 623, an SNMP subagent collection 634, a virtual wedge 637, a keyboard device driver 638, and an ADC software development kit ("SDK") 633, all described below.

The ADC data server 130 supports read ahead and non-read ahead clients. For a read ahead client, the ADC data server 130 queues data until the client is ready to read it. Read ahead de-couples ADC device performance from an ADC client's communications system performance. For a non-read ahead client, the ADC data server 130 does not post a data read to an ADC device until the client posts a read to the ADC data server 130. However, if an ADC device sends data without a read posted, the ADC data server 130 accepts the data, buffers it, and returns it to the client on the next read.

The ADC data server 130 may further support read ahead clients by automatically posting a read to the ADC device on the client's behalf when the ADC data server 130 receives data from the ADC device. When its data queue is full, the ADC data server 130 notifies the appropriate ADC device handler that no more data can be read. The next read by the client returns the data, and the ADC data server 130 notifies the appropriate ADC device handler that data can again be read. The ADC data server 130 may support non-read ahead clients by canceling all outstanding read ahead requests and not issuing another read command until the client issues a read. This allows the non-read ahead client to pace the device operator in entering data. Only one non-read ahead client will be allowed at a time for a given ADC device since the non-read ahead client paces the performance of the ADC device, according to a preferred embodiment of the invention.

The ADC data server 130 also supports synchronous and asynchronous requests. For a synchronous request, the ADC data server 130 blocks the call until the request is complete or until the timeout expires. When a synchronous request is outstanding, the ADC data server 130 blocks all other requests except for a cancel request. For asynchronous requests, the ADC data server 130 returns the call immediately with or without data. Whenever data is received for asynchronous clients, the ADC data server 130 may signal an ADC client-supplied event.

Local applications, such as the local application 111, may utilize the ADC SDK 633 in the collection of ADC data. Local applications may also utilize the ADC protocol handler collection 232, which may contain specialized DLLs for each ADC device configured to operate with the ADC device platform 100. The SDK 633 is a dynamic link library ("DLL") that allows ADC client applications to use legacy interfaces in communicating with ADC devices. Legacy interfaces include interfaces previously developed that provide access to one or more ADC devices. The SDK 633 allows programmers to write seamless ADC applications and then debug the applications before executing them on the ADC device platform 100.

DLLs allow executable routines to be stored separately as files having DLL extensions that are loaded only when needed by a program, such as by the local application 111. A DLL routine consumes no memory until it is used. Because a DLL routine is a separate file, a programmer may make connections or improvements to the routine without effecting the operation of the calling program or any other DLL routine. In addition, a programmer may use the same DLL routine with other programs. The DLL interface optimizes performance and resource overhead. The remote applications, such as the remote application 107, may also utilize the specialized DLLs provided by the ADC protocol handler collection 232. According to one exemplary embodiment of the invention, the ADC device platform 100 includes DLLs/COM objects for the various ADC symbologies, such as RF tag symbologies and bar code symbologies, that may be recognized by the ADC devices 117, 118. As described above, the ADC device platform 100 may be equipped with a wide variety of ADC device types.

In one exemplary embodiment, the SDK 633 supports programming elements such as Visual C/C++, Microsoft Foundation Class ("MFC"), Visual Basic, and Java. The SDK 633 may also include Active X control/Java classes, ADC device platform legacy DLLs, and the ADC data server API. Both the Active X control/Java classes and the ADC device platform legacy DLL may operate in connection with value-added reseller ("VAR") applications. For example, the VAR applications may provide data collection and unit management applications. The Active X control/Java classes may communicate with the VAR applications using Active X and Java APIs. The ADC device platform DLL communicates with the VAR applications through legacy APIs, such as a DLL interface, in one exemplary embodiment.

The ADC data server 130 may also communicate with the keyboard device driver 238 through the virtual wedge 217. The viral wedge 237 allows data to be transmitted from an ADC device, such as the ADC device 117, to a client, such as the local application 113, without the local application having to be aware that the data does not originate from the keyboard device driver 238. An exemplary virtual wedge is described in U.S. Pat. No. 09/239,558 entitled "Automatic Data Collection ("ADC") Device That Includes a Virtual Wedge That Routes ADC Data to Application Programs," filed on Jan. 29, 1999 and assigned to a common assignee. The virtual wedge 237 may serve as an intermediate location for the processing of data that is directed by instructions in the ADC grid.

The ADC device platform 100 utilizes the Simple Network Management Protocol ("SNMP") for network management. SNMP has recently become a well-favored network management protocol. SNMP utilizes a fetch-store paradigm in which agents and subagents maintain sets of management information such as statistics, status, and configuration values in a MIB, such as the MIBs contained in the MIB collection 623. The elements of an SNMP network management architecture typically comprise an SNMP manager, a managed system (e.g., the ADC device platform 100), a database of management information (e.g., a MIB), and a network protocol (e.g., TCP/IP). An exemplary SNMP network management architecture with regard to an embodiment of the ADC device platform 100 is further described in a provisional patent application entitled "Automatic Data Collection Device Having A Network Communications Capability," U.S. Provisional Application No. 60/084,272, filed on May 4, 1998, and assigned to a common assignee.

The SNMP master agent 629 controls the SNMP subagents in the SNMP subagent collection 624. The SNMP subagent collection 634 comprises an ADC data server SNMP subagent 627, an event log SNMP subagent 628, an ADC device SNMP subagent 625 (for the ADC device 117), and an ADC device SNMP subagent 626 (for the ADC device 118). The ADC device SNMP subagents 625, 626 respectively contain control information for the ADC devices 117, 118. The ADC device 117 and the ADC device 118 may each operate under different protocols and commands. For example, the ADC device platform 100 may be equipped with ADC devices as diverse as bar code readers and SmartCard readers. Since each ADC device typically operates under different protocols, each ADC device typically requires its own SNMP subagent. The SNMP subagent collection 634 may contain a respective ADC device SNMP subagent for each ADC device in the ADC device platform 100. Thus, the SNMP subagent collection 634 does not necessarily contain precisely two ADC device SNMP subagents. The event log SNMP subagent 628 allows the SNMP master agent 629 to retrieve the event log and set its filter. The event log SNMP subagent 628 also generates SNMP traps when specific events are received.

The SNMP master agent 629 performs SNMP packet verification on incoming and outgoing SNMP commands while a respective SNMP subagent (e.g., the ADC device SNMP subagent 625) in the SNMP subagent collection 624 performs the actual sending and retrieving of control information to/from a network element (e.g., the ADC device 117). For example, the ADC device SNMP subagents 625, 626 respectively translate between the communications protocol of ADC devices 117, 118 and the standardized SNMP protocol using information retrieved from the MIB collection 623. The SNMP master agent 629 operates with all SNMP compliant management software, according to an embodiment of the invention.

The SNMP architecture provides flexibility to the ADC device platform 100 by allowing the SNMP subagents to be added and removed without effecting the other SNMP subagents or the MIB collection 623. Adding a new ADC device to the ADC device platform 100 requires only adding a new SNMP subagent and storing relevant information in the MIB collection 223, regardless of the new ADC device's communication protocol. The SNMP architecture also aids ADC device platform manufacturers and their value-added resellers ("VARs") by simplifying the addition of new ADC devices. The ADC data server 130 communicates with the SNMP subagent collection 634 through a DLL interface. The ADC device platform SNMP master agent 629 also communicates with the ADC data server, the network communication unit 221, and the computing system's operating system.

The MIB collection 623 describes or provides management information for SNMP devices, including the ADC data server 130 and the ADC devices 117, 118. For example, the MIB collection 623 includes a reader group MIB that provides ADC device configuration, reporting ADC device statistics, and running end device diagnostics. The MIB collection 623 describes a set of objects (such as the ADC devices 117, 118) to the SNMP subagents and provides information about each object, including its structure, its relationship to other objects, and the operations allowed on the object. The MIB collection 623 essentially tells the SNMP subagents what pieces of information they may modify or view on the ADC device platform 100. Configuration, control, and statistics data particular to the ADC device platform 100 are also described in the MIB collection 623. In addition to supporting the ADC device platform, the MIB collection 623 may include additional MIBs such as: a MIB-II ("RFC 1213"), an Intermec Reader MIB, an Intermec UDP+ MIB, a Proxim WLIF Radio MIB, a Scorpion 900 MHz Radio MIB, and a 802.11 MIB ("IEEE P802.11"), and other protocols, especially RF readable tag protocols, according to an embodiment of the invention.

The ADC data server 130 may also communicate with the Reader Command/SNMP Gateway 631 to provide reader commands for the ADC devices. A Reader command controls ADC devices, such as the ADC device 117, by sending commands for operations, such as turning laser scans on and off, changing reader configuration, and performing system management operations like backup and restore. The Reader Command/SNMP gateway 631 controls parsing/formatting and routing of reader commands. The Reader Command/SNMP gateway 631 is a DLL that converts legacy reader commands to SNMP requests, according to an embodiment of the invention. Reader commands can be received from bar code devices, 900 MHz devices, and local or remote clients. The Reader Command/SNMP gateway 631 parses these commands, translates them to an object identifier ("OID") for an appropriate ADC device and then routes the command through the ADC data server 130.

Using the Reader Command/SNMP gateway 631, a client application (e.g., the remote application 109) may transfer legacy system management commands through the Reader Command/SNMP command gateway 631 to an ADC device, such as the ADC device 117. If a client (e.g., the remote application 109) requests configuration data in reader command format, then the Reader Command/SNMP gateway 631 packages the configuration data in the reader command format. This architecture isolates all legacy reader command processing in a single place, simplifying maintenance of the ADC device platform 100.

Figure 7:
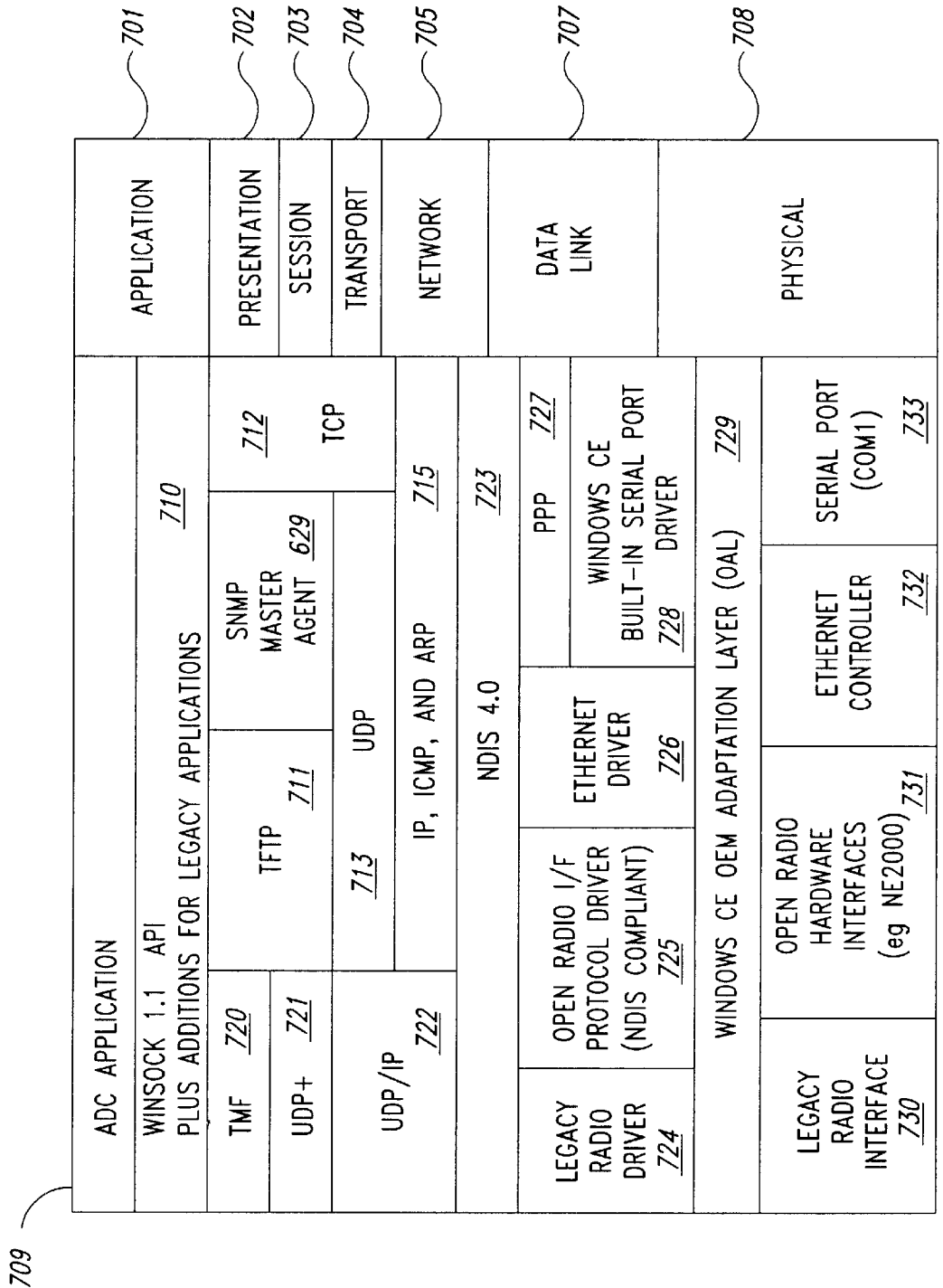
FIG. 7 illustrates an exemplary ADC device platform's communication protocol stack.

FIG. 7 illustrates an exemplary ADC device platform's communication protocol stack. Data communications systems contain a communications stack for transferring data between computers such as between the ADC device platform 100 and the remote computing system 104. Each computer typically has a communications stack containing a number of layers. For example, the open systems interconnect ("OSI") communications stack defined by the International Standards Organization consists of seven layers. The layers form a sequence from a lowest layer ("or bottom layer") to the highest layer ("or top layer"). The layers divide the processing necessary for communicating between computers into discrete units. The bottom layer in the communications stack typically interacts with the physical medium used for transferring the data, such as coaxial cables. The top layer of the communications stack provides services to application programs, and the middle layers of the communications stack typically are responsible for routing and maintaining a connection. A local computer transfers data to a remote computer when an application program first passes the data to the top layer of the communications stack of the local computer. The top layer then processes the data and sends the data to the next lowest layer in the communications stack. Thereafter, each layer in turn processes the data until the data reaches the bottom layer, where the data is sent to the remote computer over the transfer medium. The bottom layer of the communications stack of the remote computer receives the data from the transfer medium and passes the data up the communications stack. Each layer performs its specific processing on the data until the data reaches the top layer. The top layer processes the data and sends the data to an application program. A comstack manager typically starts the communication stack and maintains its stack during its lifetime.

In one exemplary embodiment, the communication stack of the ADC device platform 100 utilizes a seven-layered communication protocol, including an application layer 701, a presentation layer 702, a session layer 703, a transport layer 704, a network layer 705, a data link layer 707 and a physical layer 708. Included in the application layers 701 are ADC device platform applications 709 and the Winsock 1.1 API plus additions for legacy applications 710. The presentation layer 702 and session layer 703 may include the Terminal Message Format ("TMF") protocol 720 and UDP+ protocols 721, the Trivial File Transfer Protocol ("TFTP") protocol 711 and the SNMP master agent 629. The TCP protocol 712 is included in the application layer 701, the presentation layer 702, the session layer 703, the transport layer 704, and the network layer 705. The UDP layer 713 resides primarily in the transport layer 704. IP, ICMP, and ARP 715 reside within the network layer 705. IP refers to the well-known Internet Protocol. The Internet Control Message Protocol ("ICMP") provides diagnostic functions and can send error packets to hosts regarding message transmission. The Address Resolution Protocol ("ARP") is a low-level protocol utilized by TCP/IP that obtains a physical address when only a logical address is known. UDP/IP 722 combines UDP with IP and provides communications spanning from the session layer 703 to the transport layer 704.

Network Driver Interface Specification ("NDIS") Version 4.0 723, provides hardware and protocol independence for network drivers utilized by the ADC device platform 100. NDIS, of which version 4.0 may be used, offers a device driver standard that allows for running multiple protocols on the same network adapter.

Legacy radio driver 724 refers to pre-existing radio driver protocols that may be utilized within the ADC device platform 100. Open Radio Interface 725 provides radio driver interfaces that are customizable across radio devices. An Ethernet driver 726 enables Ethernet communications for the ADC device platform 100. The Ethernet provides a local area network ("LAN") that connects computing elements together within the same building or campus. The Ethernet is a physical link and data link protocol, reflecting the two lowest layers of the OSI model. Point-to-Point Protocol ("PPP") 727 is a data link protocol that provides a well-known method for transmitting IP frames over a circuit. The PPP 727 may communicate with a WindowsCE built-in serial port driver 728 that further processes communications into the physical layer 708.

A WindowsCE Original Equipment Manufacturer ("OEM") Adaptation Layer ("OAL") 729 represents a service provided by the WindowsCE operating system for the ADC device platform 100 that translates communications into a format required by a given OEM device. Many low-level hardware components on the ADC device platform 100 may be provided by various OEMs, and the WindowsCE operating system provides a method for communicating to the various OEM devices.

Legacy radio interface 730 provides a match at the physical layer 708 for the legacy radio driver 724. Similarly, Open Radio Hardware Interfaces 731 provides a match at the physical layer 708 for the Open Radio Interface Protocol Driver 725. Ethernet controller 732 matches with the Ethernet Driver 726, and Serial Port (COMl) 733 matches with the WindowsCE built-in serial driver 728.

The invention may operate in conjunction with a virtual wedge, a dynamic wedge, a system for simultaneously outputting data to different clients, and a system for receiving data output instructions. An exemplary virtual wedge is described in U.S. application Ser. No. 09/239,558 entitled "Automatic Data Collection ("ADC") Device That Includes A Virtual Wedge That Routes ADC Data To Application Programs," filed on Jan. 29, 1999 and assigned to a common assignee. An exemplary dynamic wedge is described in U.S. application Ser. No. 09/240,425, entitled "Automatic Data Collection ("ADC") Device That Dynamically Wedges Data Transmitted To Data Consumers," filed on Jan 29, 1999 and assigned to a common assignee. An exemplary system for simultaneously outputting data to different applications and a system for receiving output data instructions is described in U.S. application Ser. No. 09/240,303, entitled "Automatic Data Collection ("ADC") Device That Receives Data Output Instructions From Data Consumers," filed on Jan. 29, 1999 and assigned to a common assignee.

The ADC device platform 102 may be applied in connection with systems and methods for more accurate bar code scanning. Exemplary systems are described in a patent application entitled "Method for Decoding Bar Code Symbols by Declaring Erasures of Element Widths Based on Soft Decision of Measured Widths," U.S. application Ser. No. 09/007,277, filed on Jan. 14, 1998, and U.S. Pat. Nos. 5,676,473, 5,777,309, 5,539,191, 5,141,858 and 5,553,084, all assigned to a common assignee.

The ADC device platform 100 may also be applied in conjunction with improved scanning devices and procedures. One applicable approach is more clearly described in a patent application entitled "Method of Autodiscriminating in Symbology Reader Employing Prioritized and Updated Table of Symbologies," U.S. application Ser. No. 09/006, 691, filed on Jan. 14, 1998, and assigned to a common assignee.

Aspects of the invention provide a system and method for controlling several ADC device platforms. The invention is particularly applicable to instrumented ADC device platforms, including hand-held devices, but is also applicable to other computing systems as well. Under aspects of the invention, a remote computing system having browsing software receives Hypertext Markup Language ("HTML") documents, Dynamic Hypertext Mark-Up Language ("DHTML") documents, Extensible Mark-Up Language ("XML") documents, and/or other documents containing ADC device computing applications over the World Wide Web. The remote computing system, such as the remote computing system 104, uses these ADC device computing applications to communicate with a network of ADC platform devices. The SNMP master agent 629 communicates with the remote computing system 104, and a translator translates SNMP-formatted data sent to the ADC device platform 100 into a format suitable for reception by its ADC devices. Another translator translates data received from the ADC device into the SNMP format for transmission to the remote computing system. The SNMP master agent communicates with the remote computing system using the TCP, UDP/IP, or UDP+ protocols. While the SNMP protocol specifies that it uses UDP, a variant of the SNMP protocol may be used with TCP.

The ADC platform device may also utilize a wireless communications system for all or a portion of its communications with the remote computing system. Embodiments of the invention provide a data communications network that uses Internet technology to deliver data from ADC devices to local and remote applications.

The ADC device network is scaleable from a minimal system having a few ADC device platforms to a large system with hundreds of ADC device platforms connected in a network. The minimal system requires only a low-cost personal computer ("PC") based web browser, while the larger system may utilize an existing communications infrastructure having a mixture of ADC devices.

According to one embodiment of the invention, the data communications network may use Java applets as the user interface to communicate data requests, including directions to the ADC data grid, to ADC device platforms. Java is an object-oriented programming language similar to C++. Java was designed to be secure and platform neutral, meaning that Java code may run on any computing platform. Java is a useful language for programming applications for the World Wide Web since users access the web from many different types of computers. Java is especially well adapted for use in programming small applications, or applets, for use in the World Wide Web. A Java applet may be loaded and run by an already running Java application, such as a web browser. Java applets may be downloaded and run by any web browser capable of interpreting Java, such as Microsoft Internet Explorer, Netscape Navigator, and Hot Java.

Although specific embodiments of, and examples for, the invention are described herein for illustrative purposes, various equivalent modifications are possible within the scope of the invention, as will be recognized by those skilled in the relevant art. The teachings provided herein of the invention can be applied to other data symbol imaging systems, not necessarily the exemplary ADC device platform having ADC devices described above. Various exemplary data symbol enablement systems, and accordingly, various other device input and output enablement systems can be employed under the invention. While the invention discusses bar code symbologies, the invention can similarly read visual indicia of other stored images. The ADC device platform may operate with protocols and languages in addition to those specifically disclosed herein. For example, the ADC device platform is not limited to operations using HTTP, HTML, DHTML, XML, UDP, TCP/IP, FTP, SNMP, and TFTP but is equally applicable to other similar languages and protocols. Similarly, applications used within the ADC device platform, such as the ADC data server, may be developed using an object oriented programming methodology or using any other programming methodology that results in a computing system having equivalent functionality.

Aspects of the invention can be applied to not only reading machine-readable symbols and other images, but also to transmitting such images to external devices, such as computerized servers and printers. The embodiments of the invention disclosed hereinabove have been discussed primarily with regard to hand-hand devices, such as hand-held data collection terminals. However, the invention finds equal applicability in stationary data collection terminals, such as a permanently mounted device, and in desktop personal computers.

All of the above U.S. patents and applications are incorporated by reference.

These and other changes can be made to the invention in light of the above detailed description. In general, in the following claims, the terms used should not be construed to limit the invention to the specific embodiments disclosed in the specification and the claims, but should be construed to include all ADC device platforms, data collection terminals, and data symbol imaging systems hat operate under the claims set forth hereinbelow. Accordingly, the invention is not limited by the disclosure, but instead its scope is to be determined entirely by the following claims.

What is claimed is:

1. A method for routing a data set from at least one automatic data collection ("ADC") device, comprising:
    receiving the data set from the at least one ADC device, wherein the data set has a data type;
    identifying the data type of the data set;
    identifying at least one client application from a plurality of client applications to receive the data set using the identified data type; and
    routing the data set only to the identified at least one client application.

2. The method of claim 1 wherein identifying the at least one client application comprises locating a data routing instruction for the at least one ADC device and the identified data type of the data set.

3. The method of claim 1 wherein identifying the at least one client application comprises locating a data routing instruction for the at least one ADC device and the identified data type of the data set and wherein the data routing instruction for the at least one ADC device and the identified data type of the data set are located in an ADC data grid.

4. The method of claim 1 wherein identifying the data type of the data set is performed when the received data set from the at least one ADC device does not include a client handle that identifies the at least one client application.

5. The method of claim 1 wherein the data set is received by an ADC data server in an ADC device platform that contains the at least one ADC device, the ADC data server identifying the data type of the data set.

6. The method of claim 1 wherein the data type of the data set includes bar code data, radio frequency ("RF") tag data, resonator data, magnetic stripe data, two-dimensional symbol data, optical character recognition ("OCR") data, dipole device data, text data, or speech input data.

7. The method of claim 1 wherein the at least one ADC device is one of a bar code reader, a radio frequency ("RF") tag reader, a resonator reader, a SmartCard reader, a magnetic stripe reader, a two-dimensional symbol reader, an optical character recognition ("OCR") reader, a dipole device reader, and a speech input recognizing device.

8. The method of claim 1, further comprising:
    receiving a data reading instruction from the at least one client application for the at least one ADC device;
    sending the data reading instruction to the at least one ADC device; and
    reading the data set by the at least one ADC device that sends the data set to a data processor that identifies the data type of the data set.

9. The method of claim 1, further comprising:
    receiving a data reading instruction from the at least one client application for the at least one ADC device;
    sending the data reading instruction to the at least one ADC device; and
    reading the data set by the at least one ADC device that sends the data set to an ADC data server that receives the data reading instruction from the at least one client application, directs the translation of the data reading instruction into a native format of the at least one ADC device, and identifies the data type of the data set.

10. The method of claim 1, further comprising:
receiving a data reading instruction from the at least one client application for the at least one ADC device;
sending the data reading instruction to the at least one ADC device;
reading the data set by the at least one ADC device that sends the data set to an ADC data server that receives the data reading instruction from the at least one client application, directs the translation of the data reading instruction into a native format of the at least one ADC device, and identifies the data type of the data set, wherein the ADC data server directs a protocol handler and a device handler to translate the data reading instruction into the native format of the at least one ADC device.

11. The method of claim 1, further comprising:
identifying at least another client application of the plurality of client applications to receive the data set using the identified data type.

12. The method of claim 1, further comprising:
identifying at least another client application of the plurality of client applications to receive the data set using the identified data type, wherein the at least one client application resides in an ADC device platform that contains the at least one ADC device and the at least another client application resides on a remote computing system.

13. The method of claim 1, further comprising:
identifying at least another client application of the plurality of client applications to receive the data set using the identified data type, wherein the at least one client application resides in an ADC device platform that contains the at least one ADC device and the at least another client application resides on a remote computing system and wherein communications between the at least one client application and the ADC device platform pass over at least one of an intranet, an internet, a local area network, a wide area network, and the World Wide Web.

14. The method of claim 1, further comprising:
identifying at least another client application of the plurality of client applications to receive the data set using the identified data type, wherein the at least one ADC device resides in an ADC device platform, the at least one client application resides in a remote computing system, and the at least another client application resides in another remote computing system.

15. The method of claim 1, further comprising:
identifying at least another client application of the plurality of client applications to receive the data set using the identified data type, wherein at least another client application resides on a remote computing system and the ADC device platform communicates with the remote computing system using one of the Transmission Control Protocol ("TCP"), the User Datagram Protocol ("UDP"), and the User Datagram Protocol Plus ("UDP+").

16. A system for routing a plurality of data sets from a plurality of automatic data collection ("ADC") devices, comprising:
an ADC data server that receives the plurality of data sets from the plurality of ADC devices wherein each data set has a data type;
an ADC data grid that retains data type requests for a plurality of client applications; and
an ADC grid data matcher that identifies a data type of each data set of the plurality of data sets and matches the identified data type of the data set against the data type requests in the ADC data grid to determine if one or more client applications of the plurality of client applications should receive the data set; and
a data router that routes the data set of the plurality of data sets only to the at least one client application of the plurality of client applications having the data type request that matches the identified data type.

17. The system of claim 16 wherein the ADC data grid further comprises a data routing instruction for the data set based upon the ADC device that provided the data set and upon the identified data type of the data set.

18. The system of claim 16 wherein the ADC data server resides in an ADC device platform that contains the plurality of ADC devices.

19. The system of claim 16 wherein a data type for the data set of the plurality of data sets comprises one of bar code data, radio frequency ("RF") tag data, resonator data, SmartCard data, magnetic stripe data, optical character recognition ("OCR") data, text data, two-dimensional symbol data, dipole device data, and speech input data.

20. The system of claim 16 wherein at least one ADC device of the plurality of ADC devices is one of a bar code reader, a radio frequency ("RF") tag reader, a resonator reader, a SmartCard reader, a magnetic stripe reader, an optical character recognition ("OCR") reader, a two-dimensional symbol reader, a dipole device reader, and a speech input recognizing device.

21. The system of claim 16, further comprising:
an instruction receiver in the ADC device platform that receives a data reading instruction from at least one client of the plurality of clients;
an ADC device handler that receives the data reading instruction from the instruction receiver and translates instructions for the ADC device into a native format for the ADC device; and
a data reading instruction router that routes instructions in the native format to the ADC device for receipt by the ADC data server.

22. The system of claim 16, further comprising:
an instruction receiver in the ADC device platform that receives a data reading instruction from at least one client of the plurality of clients;
an ADC device handler that receives the data reading instruction from the instruction receiver and translates instructions for the ADC device into a native format for the ADC device;
a data reading instruction router that routes instructions in the native format to the ADC device for receipt by the ADC data server; and
an ADC protocol handler that translates device-specific portions of the data reading instruction into a native formation of the at least one ADC device for transmission by the data reading instruction router.

23. The system of claim 16 wherein the grid data matcher identifies at least one client application and at least another client application, both of the plurality of client applications, to receive the data set based upon examination of the ADC data grid.

24. The system of claim 16 wherein the grid data matcher identifies at least one client application and at least another client application, both of the plurality of client applications, to receive the data set based upon examination of the ADC data grid and wherein the at least one client application resides in an ADC device platform that contains the at least one ADC device and the at least another client application resides on a remote computing system.

25. The system of claim 16 wherein the grid data matcher identifies at least one client application and at least another client application, both of the plurality of client applications, to receive the data set based upon examination of the ADC data grid and wherein the ADC data server and the plurality of ADC devices reside in an ADC device platform, the at least one client application resides in a remote computing system and the at least another client application resides in another remote computing system.

26. The system of claim 16 wherein the grid data matcher identifies at least one client application and at least another client application, both of the plurality of client applications, to receive the data set based upon examination of the ADC data grid and wherein the at least another client application resides in a remote computing system and the ADC device platform communicates with the remote computing system using one of the Transmission Control Protocol ("TCP"), the User Datagram Protocol ("UDP"), and the User Datagram Protocol Plus ("UDP+").

27. The system of claim 16 wherein the grid data matcher identifies at least one client application and at least another client application, both of the plurality of client applications, to receive the data set based upon examination of the ADC data grid and wherein communications between at the least one client application of the plurality of client applications and the ADC device platform pass over at least one of an intranet, an internet, a local area network, a wide area network, and the World Wide Web.

28. An automatic data collection ("ADC") network that transmits data, comprising:
 a plurality of ADC device platforms, such that each ADC device platform comprises:
  at least one ADC device;
  an ADC data server that receives a plurality of data sets having data types from the at least one ADC device;
  an ADC data grid that contains data type requests for a plurality of client applications;
  an ADC grid data matcher that identifies the data type of each data set of the plurality of data sets and matches the identified data type of the data set against the data type requests in the ADC data grid to determine if one or more client applications of plurality of client applications should receive the data set; and
  a data router that routes the data set of the plurality of data sets only to the at least one client application of the plurality of client applications having the data type request matching the identified data type.

29. The system of claim 28 wherein the ADC data grid further comprises a data routing instruction for the data set based upon the ADC device that provided the data set and upon the identified data type of the data set.

30. The system of claim 28 wherein a data type for the data set of the plurality of data sets comprises one of bar code data, radio frequency ("RF") tag data, resonator data, SmartCard data, magnetic stripe data, optical character recognition ("OCR") data, two-dimensional symbol data, text data, dipole device data, and speech input data.

31. The system of claim 28 wherein at least one ADC device of the plurality of ADC devices is one of a bar code reader, a radio frequency ("RF") tag reader, a resonator reader, a SmartCard reader, a magnetic stripe reader, an optical character recognition ("OCR") reader, a dipole device reader, two-dimensional symbol reader and a speech input recognizing device.

32. The system of claim 28 wherein each ADC device platform further comprises:
 an instruction receiver that receives a data reading instruction from at least one client of the plurality of clients;
 an ADC device handler that receives the data reading instruction from the instruction receiver and translates instructions for the ADC device into a native format for the ADC device; and
 a data reading instruction router that routes instructions in the native format to tie ADC device for receipt by the ADC data server.

33. The system of claim 28 wherein each ADC device platform further comprises:
 an instruction receiver that receives a data reading instruction from at least one client of the plurality of clients;
 an ADC device handler that receives the data reading instruction from the instruction receiver and translates instructions for the ADC device into a native format for the ADC device;
 a data reading instruction router that routes instructions in the native format to the ADC device for receipt by the ADC data server; and
 an ADC protocol handler that translates device-specific portions of the data reading instruction into a native formation of the at least one ADC device for transmission by the data reading instruction router.

34. The system of claim 28 wherein the grid data matcher identifies at least one client application and at least another client application, both of the plurality of client applications, to receive the data set based upon examination of the ADC data grid.

35. The system of claim 28 wherein the grid data matcher identifies at least one client application and at least another client application, both of the plurality of client applications, to receive the data set based upon examination of the ADC data grid and wherein the at least one client application resides in an ADC device platform that contains the at least one ADC device and the at least another client application resides on a remote computing system.

36. The system of claim 28 wherein the grid data matcher identifies at least one client application and at least another client application, both of the plurality of client applications, to receive the data set based upon examination of the ADC data grid and wherein the at least one client application of the plurality of client applications resides in a remote computing system and at least another client application resides in another remote computing system.

37. The system of claim 28 wherein the grid data matcher identifies at lease one client application to receive the data set based upon examination of the ADC data grid and wherein the at least one client application resides in a remote computing system and the at least one ADC device platform communicates with the remote computing system using one of the Transmission Control Protocol ("TCP"), the User Datagram Protocol ("UDP"), and the User Datagram Protocol Plus ("UDP+").

38. The system of claim 28 wherein the grid data matcher identifies at least one client application to receive the data set based upon examination of the ADC data grid and wherein communications between the at least one client application and the at least one ADC device platform pass over at least one of an intranet, an internet, a local area network, a wide area network, and the World Wide Web.

* * * * *